United States Patent [19]
Cook

[11] Patent Number: 5,875,813
[45] Date of Patent: *Mar. 2, 1999

[54] AUTOMATIC BACK WATER VALVE SYSTEM

[76] Inventor: William H. Cook, 1401 Erika Dr., Springfield, Ohio 45503

[ * ] Notice: The term of this patent shall not extend beyond the expiration date of Pat. No. 5,538,032.

[21] Appl. No.: 823,809

[22] Filed: Mar. 24, 1997

Related U.S. Application Data

[63] Continuation-in-part of Ser. No. 681,037, Jul. 22, 1996, abandoned, which is a continuation-in-part of Ser. No. 377,196, Jan. 24, 1995, Pat. No. 5,538,032.

[51] Int. Cl.⁶ ........................................................ F16K 3/02
[52] U.S. Cl. .................... 137/362; 137/505; 137/505.21; 137/505.26; 251/327
[58] Field of Search ..................................... 137/362, 505, 137/505.21, 505.26; 251/61, 327

[56] References Cited

U.S. PATENT DOCUMENTS

| | | |
|---|---|---|
| 1,685,932 | 10/1928 | Andersson . |
| 1,991,081 | 2/1935 | Charpier . |
| 2,431,399 | 11/1947 | Hull . |
| 2,904,064 | 9/1959 | Davis . |
| 3,115,890 | 12/1963 | Greenbaum . |
| 3,213,764 | 10/1965 | Nelson et al. . |
| 3,486,731 | 12/1969 | Magnani et al. . |
| 4,187,873 | 2/1980 | Mehoudar . |
| 4,257,447 | 3/1981 | Clarkson . |
| 4,432,388 | 2/1984 | Best . |
| 4,637,425 | 1/1987 | Petersen . |
| 5,538,032 | 7/1996 | Cook ....................................... 137/362 |

*Primary Examiner*—Stephen M. Hepperle
*Attorney, Agent, or Firm*—Jacox, Meckstroth & Jenkins

[57] ABSTRACT

A valve body is formed in two half sections which are secured together to define a drain line passage and to confine therebetween a thin gate valve blade for movement between a lower open position and an upper closed position. An actuator includes a flexible bellows sealed to the valve body above the passage and a top plate connected by a rod to the valve blade. The valve body and the bellows define an expandable fluid chamber connected by a bottom port or line to the drain line. The valve body is installed within a sewage drain line extending under a floor. In the event sewage water backs up within the drain line, air within the fluid chamber is compressed to expand the bellows upwardly for closing the valve. When the sewage water flows from the drain line, the air pressure reduces, and the bellows collapses downwardly due to the weight of the top plate and automatically returns the valve blade downwardly to its open position.

21 Claims, 3 Drawing Sheets

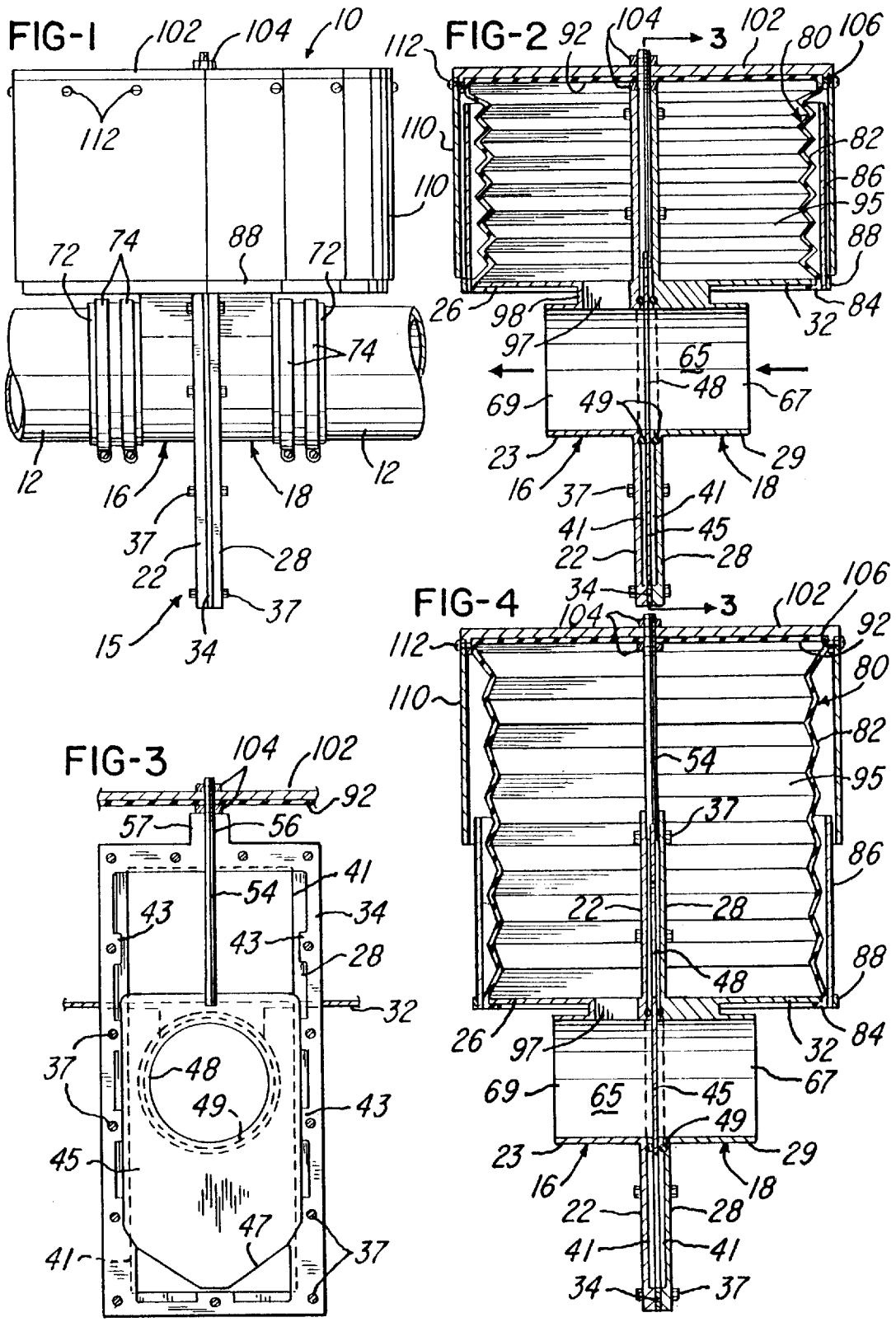

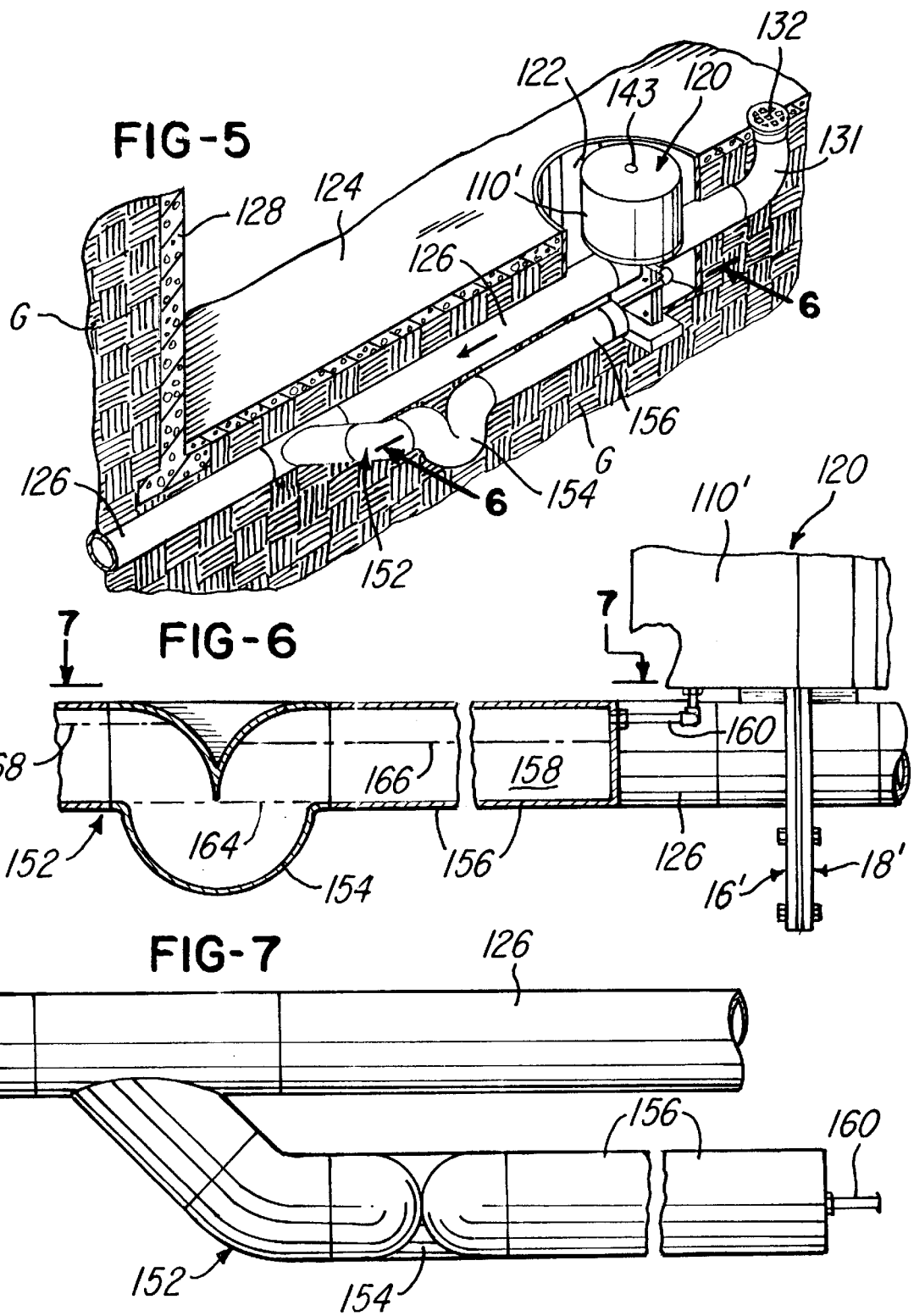

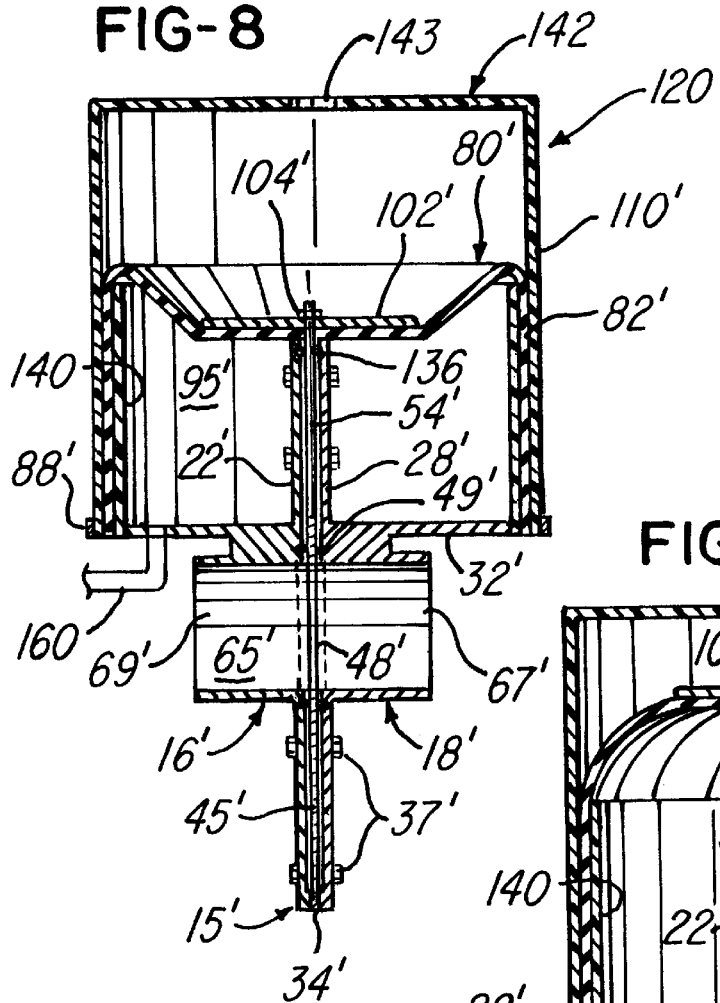
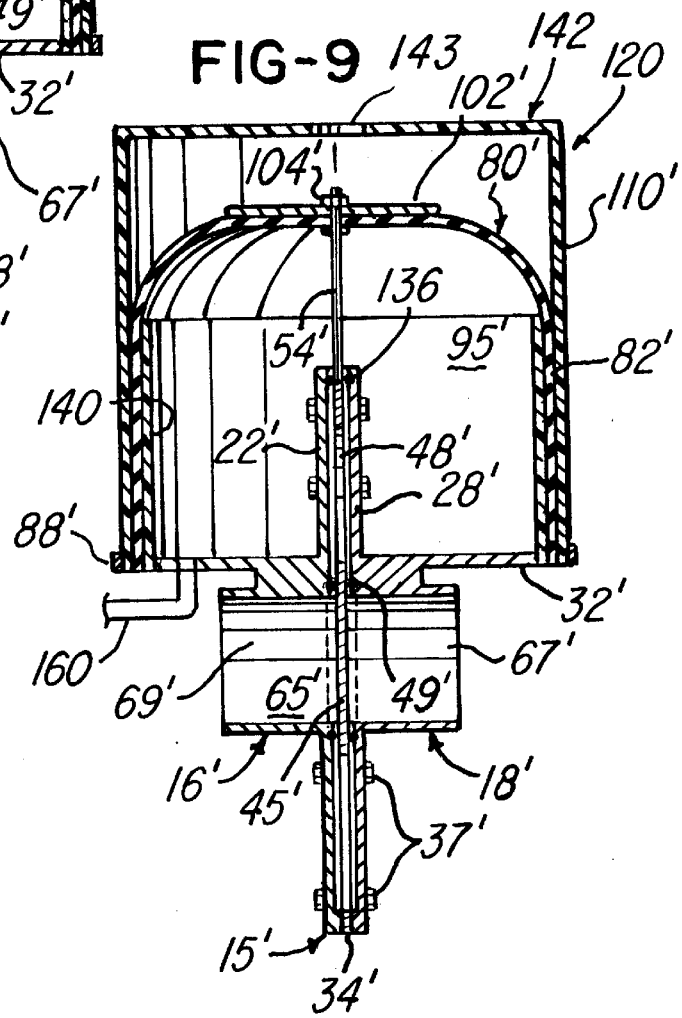

AUTOMATIC BACK WATER VALVE SYSTEM

RELATED APPLICATIONS

This application is a continuation-in-part of application Ser. No. 08/681,037, now abandoned which is a continuation of application Ser. No. 08/377,196, filed Jan. 24, 1995, Pat. No. 5,538,032.

BACKGROUND OF THE INVENTION

In the art of back water check valves for installation in a sanitary sewer line, for example, as disclosed in U.S. Pat. Nos. 1,991,081, No. 2;904,064 and No. 4,637,425, various designs have been proposed or used for automatically closing a valve member in the event that sewage water backs tip within the drain line. This prevents the sewage water from backing up into the building.

As disclosed in Pat. No. 1,991,081, a float member is used to sense the water level within the drain line, and the float member operates a controller for controlling a reversible motor which opens and closes a gate valve. In Pat. No. 2,904,064, a back water valve includes a gate valve member which is spring loaded in an open position, and a float senses the elevated water within the drain line and releases or trips the gate valve member for closing in the event the float is elevated by water backing up in the drain line. Pat. No. 4,637,425 discloses a flapper-type check valve which has a pivoting valve member. The valve member is pivoted to a closed position by a spring actuated rod which is released from its cocked position by actuation of a solenoid controlled by a float actuated switch. After the backed up water drains from the sewer line, the check valves are manually reset. Other types of fluid actuated gate valves have also been constructed or proposed, for example, as disclosed in U.S. Pat. No. 1,685,932.

In any such back water valve for use in a sanitary sewer line extending from a building, it is desirable for the valve to be simple and economical in construction, be dependable and reliable in operation, be easy to assemble and install, avoid any flow restriction in the drain line when valve is open, and be automatic in operation. That is, it is desirable for the valve to close positively when water backs up in the sewer line and then automatically open when the sewer line is again open for use. After analyzing the back water valves or check valves disclosed in the above patents, it is apparent that none of the valves provide all of the desirable features mentioned above.

SUMMARY OF THE INVENTION

The present invention is directed to an improved back water valve which is ideally suited for installation within a sewer line located under the floor of a building and which provides all of the desirable features and advantages mentioned above. In accordance with one embodiment of the invention, a back water valve includes a valve body formed by two mating and opposing body sections which are substantially identical and are coupled together to define a straight through drain line passage having an inlet and an outlet. The body sections confine therebetween a thin metal gate valve blade member which is supported for vertical reciprocating movement between a lower position which opens the passage and an upper position which closes the passage.

The valve body sections form a circular wall above the passage and which is sealed to the lower end portion of a cylindrical flexible member or bellows defining an expandable chamber. The upper end portion of the bellows is closed and receives a circular top cover plate which mounts on the upper end portion of an actuating rod having a lower end portion secured to the top of the blade member. A wall surrounds the bellows for protection, and the bottom of the expandable chamber is connected to the drain line by a passage or a port defined in the outlet body section.

When the back water valve is installed, the bellows is normally in a collapsed downward position, and the valve blade member is in its lower open position. When sewage water backs up within the drain line, the fluid pressure within the expandable chamber, increases by displaced trapped air to expand the bellows and shift the blade member to its upper closed position blocking the drain line passage. When the drain line is subsequently opened and sewage water drains through the drain line, the fluid pressure within the chamber decreases so that the bellows collapses due to the weight of the top cover plate and automatically returns the blade member to its lower open position.

Other features and advantages of the invention will be apparent from the following description, the accompanying drawings and the appended claims.

BRIEF DESCRIPTION OF THE DRAWINGS

FIG. 1 is a side elevational view of a back water valve system constructed in accordance with the invention and showing the valve system installed within a drain line;

FIG. 2 is an axial vertical section of the back water valve system of FIG. 1 and shown in the open position;

FIG. 3 is a fragmentary section taken generally on the line 3—3 of FIG. 2;

FIG. 4 is a vertical section similar to FIG. 2 and showing the back water valve system in its closed position;

FIG. 5 is a perspective view of a back water valve system constructed in accordance with a second embodiment of the invention and shown installed under a basement floor;

FIG. 6 is a fragmentary section taken generally on the line 6—6 of FIG. 5;

FIG. 7 is a plan view taken on the line 7—7 of FIG. 6;

FIG. 8 is a section similar to FIG. 2 and showing the second embodiment of the valve system in its open position; and FIG. 9 is a section similar to FIG. 8 and showing the valve system in its closed position.

DESCRIPTION OF THE PREFERRED EMBODIMENTS

FIG. 1 illustrates a back water valve system 10 constructed in accordance with the invention and installed within a conventional sewer line 12 which may be plastic or cast iron. The valve 10 includes a valve body 15 which is formed by two mating and opposing body sections 16 and 18. Each of the body sections is shown as constructed of cast metal but may also be injection molded of a rigid plastics material. The body section 16 includes a generally flat rectangular wall 22 from which projects a cylindrical outlet coupling portion 23 and a semi-circular top wall 26. Similarly, the valve body section 18 includes a generally flat rectangular wall 28, a cylindrical inlet coupling portion 29 and a semi-circular top wall 32.

A frame-like stainless steel spacer plate 34 is confined or sandwiched between the walls 22 and 28 with suitable gaskets or sealing mastic, and the walls 22 and 28 are secured together by peripherally spaced bolts 37. Each of the walls 22 and 28 defines a shallow rectangular cavity 41 (FIG. 2), and the spacer plate 34 is provided with inwardly projecting tabs 43 (FIG. 3) which cooperate with the walls 22 and 28 to form a track or channel for a sliding stainless steel gate valve blade member 45. The blade member 45 is generally rectangular with a V-shaped lower edge surface 47 and a circular hole or opening 48 within its upper portion. A pair of resilient O-rings 49 are confined within corresponding annular grooves within the opposing faces of the walls 22 and 28 and form fluid-tight seals with the sliding blade member 45. An actuating rod 54 has a lower end portion with a slot for receiving the upper end portion of the blade member 45 and is secured by welding to the blade member. The rod 54 projects upwardly through a cylindrical bore 56 defined by the walls 22 and 28 and between the upper end portions 57 of the spacer plate 34.

When the valve body sections 16 and 18 are coupled together by the bolts 37 and with the spacer plate 34 and sliding blade member 45 confined between the walls, the cylindrical coupling portions 23 and 29 define a drain line passage 65 hiving an inlet 67 and an outlet 69. The cylindrical coupling portions 23 and 29 are each connected to an opposing section of the drain line 12 by a resilient rubber coupling sleeve 72 and a pair of circumferentially extending hose or band clamps 74.

A generally cylindrical bellows 80 is molded of a non-elastic flexible rubber or plastics material and has a side wall 82 with a zig-zag corrugated cross-sectional configuration. The wall 82 has a lower end portion 84 which surrounds the circular wall formed by the mating semi-circular wall sections 26 and 32, and a cylindrical stainless sheet steel shroud 86 surrounds the wall 82 and tightly surrounds the lower end portion 84 of the wall 82. A cylindrical band clamp 88 surrounds the lower end portion of the sheet metal shroud 86 and compresses the lower end portion of the bellows wall 82 against the circular wall sections 26 and 32 to form a fluid-tight seal.

The bellows 80 has an integrally molded top wall 92 which cooperates with the side wall 82 and the wall sections 26 and 32 to define an expandable fluid chamber 95 which surrounds the upper portions of the connected flat body walls 22 and 28. The chamber 95 is connected to the drain line passage 65 by a port or opening 97 formed within a boss 98 at the top of the outlet coupling portion 23.

The top wall 92 of the bellows 80 is covered by a circular top plate 102 which is cast of metal and has a predetermined weight, for example, about 14 pounds. The center portion of the plate 102 is rigidly connected to the upper threaded end portion of the actuating rod 54 by a pair of lock nuts 104. The top plate 102 has a downwardly projecting peripheral flange 106 which receives the upper end portion of a cylindrical stainless sheet steel shroud 110 having an inside diameter slightly larger than the outside diameter of the shroud 86. A series of peripherally spaced screws 112 secure the shroud 110 to the cover plate flange 106. In place of the telescopic shrouds 86 and 110, an inverted metal or plastic container or enclosure may be mounted on the outer edge portion of the wall sections 26 and 32 and cover the bellows 80 and top plate in their expanded position (FIG. 4).

In operation, when the back water valve system 10 is installed in the sewage drain line 12, the valve is normally in the open position (FIG. 2). In this position, the bellows 80 is in its collapsed position (FIG. 2) and the gate valve blade member 45 is in its downward open position when the opening 48 is aligned with the passage 65. When sewage water backs up and fills the line 12, the water flows upwardly through the port 97 and into the chamber 95 to compress the air trapped within the chamber 95. As the head or pressure on the back water increases and the water level goes up within the chamber 95, the air pressure within the upper portion of the chamber increases sufficiently to lift the top plate 102 and pull the gate valve blade member 45 upwardly until it reaches its closed position (FIG. 4). In this closed position, the bellows 80 is fully expanded and the air pressure within the upper portion of the chamber 95 is sufficient, for example, over 0.25 psi, to hold the valve 10 in its closed position where the blade member 45 engages the upper end portion of the spacer plate 34. When the valve system 10 is closed, any further increase in the fluid pressure within the backed up sewage water is blocked at the outlet 69 of the passage 65. Since the sewage drain line 12 is usually located a couple feet below a building floor surface, the back water valve system 10 is effective to prevent the sewage water from backing up within the sewer line 12 to a level above the floor surface.

When the problem causing the blockage in the sewer line 12 is corrected, and the fluid pressure on the water within the line 12 decreases, the level of the water within chamber 95 descends. As the water flows from the expandable chamber 95 through the port 97 into the passage 65 and line 12, the air pressure within the upper portion of the chamber 95 decreases. The weight of the top plate 102 is then effective to collapse the bellows 80 and move the gate valve blade member 45 downwardly to its open position where sewage water is free to flow through the passage 65.

Referring to FIGS. 5–9 which show another embodiment of a back water valve system constructed in accordance with the invention, a back water valve system or unit 120 is submerged within a surrounding cylindrical fiberglass casing 122 recessed within a basement floor 124 of a building. The valve unit 120 is connected within a drain line 126 which extends in the ground G under a basement floor 124 and the footer for a basement wall 128. The drain line 126 extends from the valve unit 120 to an elbow 131 and a drain outlet 132 within the basement floor 124.

The back water valve unit 120 is constructed generally the same as the valve unit 10 described above in connection with FIGS. 1–4, and accordingly, the same reference numbers are used for corresponding parts or components but with the addition of prime marks. Thus a valve body 15' (FIGS. 8 & 9) includes mating body sections 16' and 18' which are illustrated in cast metal but may also be molded of a rigid plastics material. The valve body sections 16' and 18' are clamped together by the bolts 37' and confined therebetween a valve member or blade 45' having a port 48'. A blade actuator rod 54' projects upwardly from the blade 45' between the walls 22' and 28', and a diaphragm-like bellows 80' has a center portion secured to the actuating rod 54' by a top plate 102' and a nut 104'. A resilient sealing ring 136 is confined within a groove within the walls and surrounds the rod 54'.

The bellows 80' includes a cylindrical side wall 82' which is confined by a rigid plastic inner cylindrical wall 140 secured to the circular wall 32' of the valve body 15'. The bellows wall 82' is surrounded by a cylindrical wall or shroud 110' of an inverted containerlike enclosure 142 molded of a rigid plastics material. The top wall of the enclosure 142 has a center hole or opening 143 for permitting air to flow into and out of the enclosure 142 which has a bottom edge portion secured to the wall 32' of the valve body 15' by a surrounding band clamp 88'. The cylindrical inlet 67' and outlet 69' define a water passage 65' and are each connected to the drain line 126 by a coupling sleeve 72 and band clamps 74 in the same manner as shown and described above in connection with FIG. 1.

As shown in FIGS. 5–7, the back water valve unit or system 120 further includes a drain line extension 152 which connects at an acute angle with the drain line 126 downstream of the back water valve body 15'. The drain line extension 152 includes a U-shaped water trap member 154 and a tubular portion 156 defining a fixed back-up water chamber 158. The tubular portion 156 of the drain line extension 152 is spaced parallel and horizontally from the main drain line 126, as shown in FIGS. 6 and 7. A fluid or air line 160 connects the upper portion of the chamber 158 to the bottom of the expandable fluid chamber 95' defined above the valve body wall 32' and within the bellows 80'. Thus the drain line extension 152 and the line 160 form a fluid passage for back-up water within the drain line 126 to flow into and out of the chamber 158 through the trap 154 and also a passage for displaced air within the chamber 158 to flow into and out of the chamber 95'.

The back water valve system 120 including the back water extension 152 and the fixed air displacement chamber 158 are ideally suited for use within a drain line 126 which is close to the basement floor 124 of a building, for example, from four to twelve inches below the floor 124. The operation of the back water valve system 120 is generally the same as the operation of the back water valve system 10 described above. That is, when the drain line 126 is essentially empty and filled with air, the drain water has a level 164 within the trap 154 so that air within the chamber 158 is effectively trapped by the water at the level 164. As water begins to back up within the drain line 126, the water raises in the chamber 158 towards a level 166 thereby compressing the trapped air within the chamber. The compressed air within the chamber 158 flows through the passage within the line 160 and into the chamber 95'. When the water within the chamber 158 reaches the level 166, air pressure within the chamber 95' is sufficient to have moved the bellows 80' and the valve member 45' from the open position (FIG. 8) to the closed position (FIG. 9) as a result of the increased pressure within the chamber 95'.

When the valve member or blade 45' is in its closed position, the back-up water within the drain line 126 is stopped at an approximate level 168 which is slightly higher than the level 166 within the chamber 158 since the air within the upper portion of the chamber 158 is more compressed. When the back-up water flows out of the drain line 126 and the drain line extension 152, the water level within the chamber 158 drops to the water level 164, thereby returning the air pressure within the upper portion of the fixed chamber 158 and the air pressure within the expandable chamber 95' to the normal air pressure which is essentially atmospheric air pressure. The decrease of air pressure within the chamber 95' causes the diaphragm 80' and valve member 45' to move downwardly to the normally open position (FIG. 8) as a result of the weight of the top plate 102' and the suction created within the chambers 95' and 158.

From the drawings and the above description, it is apparent that a back water valve system constructed in accordance with the present invention, provides desirable features and advantages. For example, the back water valve system 10 or 120 is simple, compact and economical in construction and also dependable in operation. In addition, the valve system operates automatically without the need for electrical power and provides no restriction to the flow of drain water when the valve is in its open position. It is further apparent that the valve body sections 16 and 18 or 16' and 18' are substantially identical except for the opening or port 97 in the section 16 or the passage for the air line 160. Thus when the valve body sections are cast in metal, the same mold may be used.

When the body sections 16 and 18 or 16' and 18' are cast in metal, the spacer plate 34 or 34' has a thickness which is a few thousandths greater than the thickness of the gate valve blade member 45 or 45'. This is preferred so that only the rectangular frame-like faces of the walls 22 and 28 or 22' and 28' require machining or surface grinding. However, if the body sections are molded of a plastics material, the recess spacer plate may be omitted and opposing recesses may be formed within the flat faces of the walls for receiving the blade member for sliding movement.

The telescopic cylindrical shrouds 86 and 110 or the inverted stationary enclosure 142 is provided to protect the flexible bellows 80 or 80', but are not required for the performance or operation of the back water valve. The arrangement of the gate valve blade member 45 or 45' with a lower open position and an upper closed position, and its continuous contact with the O-rings 49, are also desirable. This assures that the path for the blade member is always open and that the O-rings 49 form dependable fluid-tight seals when the valve is closed. The portion of the blade member defining the lower half of the opening 48 or 48' may also be provided with a sharp edge in order to shear through any semi-solid material which might be within the opening and interfere with the closing of the blade member. It is also apparent that a set of circumferentially spaced tension coil springs may be used outboard of the bellows 80 to connect the top plate 102 to the bottom wall sections 26 and 32 in order to reduce the weight of the top plate or wall 102. In addition, the back water valve system 120 may be used when the drain line 126 is close to the floor 124.

While the forms of back water valve system herein described and their method of construction and operation constitute preferred embodiments of the invention, it is to be understood that the invention is not limited to the precise methods and forms of valve systems described, and that changes may be made therein without departing from the scope and spirit of the invention as defined in the appended claims. For example, a back water/air displacement chamber such as the chamber 158 or a chamber within a manhole forming part of the drain line, may be used between the drain line and the expandable chamber 95 or 95' so that only displaced air enters the chamber 95 or 95'.

The invention having thus been described, the following is claimed:

1. A back water valve system for installing in a gravity flow sewage drain line containing air, said valve system comprising a valve body defining a water passage having an inlet and an outlet connected to the drain line, a valve member disposed between said inlet and said outlet and moveable between a retracted open position permitting water to flow through said passage and a closed position blocking the flow of water through said passage, means forming an expandable fluid chamber and including an actuator moveable between a first position and a second position, said actuator connected to said valve member for moving said valve member from said open position to said closed position in response to movement of said actuator from said first position to said second position, means for trapping air displaced by water backing up in the drain line, and a means for increasing the fluid pressure within said expandable fluid chamber and moving said actuator to said second position and said valve member to said closed position in response to an increase in pressure of trapped air.

2. A valve system as defined in claim 1 wherein said expandable fluid chamber is disposed above said water passage, and said valve member comprises a generally flat valve blade moveable downwardly to said open position and upwardly to said closed position.

3. A valve system as defined in claim 1 wherein said expandable fluid chamber is at least partially defined by a flexible fluid impermeable material.

4. A valve system as defined in claim 1 and including means for automatically moving said actuator to said first position and said valve member to said open position in response to a reduction of fluid pressure within said expandable fluid chamber.

5. A valve system as defined in claim 1 wherein said valve member comprises a substantially thin flat valve blade, and said valve body comprises a pair of mating and opposing body sections confining therebetween said valve blade for sliding movement between said open and closed positions.

6. A valve system as defined in claim 5 wherein each of said body sections includes an upper wall forming a bottom wall for said expandable fluid chamber.

7. A valve system as defined in claim 1 wherein said expandable fluid chamber is positioned above said water passage, and means defining an opening at the bottom of said chamber for directing backup water from said water passage into said chamber and for gravity draining of backup water from said chamber into said water passage.

8. A valve system as defined in claim 1 wherein said actuator includes a weight member for urging said actuator downwardly to said first position and said valve member to said open position.

9. A valve system as defined in claim 1 wherein said expandable fluid chamber is at least partially defined by a generally cylindrical bellows of flexible and non-elastic fluid impermeable material, and a generally cylindrical wall member adjacent said bellows and supported by said valve body.

10. A back water valve system for installing in a gravity flow sewage drain line containing air, said valve system comprising a valve body defining a water passage having an inlet and an outlet connected to the drain line, a generally flat valve blade disposed between said inlet and said outlet and moveable downwardly to an open position permitting water to flow through said passage and upwardly to a closed position blocking the flow of water through said water passage, means forming an expandable fluid chamber and including an actuator moveable between a first position and a second position, said actuator connected to said valve blade for moving said valve blade from said open position upwardly to said closed position in response to movement of said actuator from said first position to said second position, and a fluid passage extending between said expandable fluid chamber and said drain line for trapping air displaced by water backing up in the drain line for increasing the fluid pressure within said chamber to move said actuator to said second position and said valve member to said closed position.

11. A valve system as defined in claim 10 wherein said chamber is positioned above said water passage, and said fluid passage is defined at the bottom of said chamber for directing backup water from said water passage into said chamber and for gravity draining of backup water from said chamber into said water passage.

12. A valve system as defined in claim 10 wherein said chamber is at least partially defined by a flexible fluid impermeable material.

13. A valve system as defined in claim 10 and including means for automatically moving said actuator to said first position and said valve member to said open position in response to a reduction of fluid pressure within said fluid passage and said chamber.

14. A valve system as defined in claim 13 wherein said means for automatically moving said actuator comprise a weight member positioned for urging said actuator downwardly to said first position and said valve member to said open position.

15. A valve system as defined in claim 10 wherein said valve body comprises a pair of mating and opposing body sections confining therebetween said valve blade for sliding movement between said open and closed positions.

16. A valve system as defined in claim 15 wherein each of said body sections includes an upper wall forming a bottom wall for said expandable chamber.

17. A valve system as defined in claim 10 wherein said fluid passage comprises a drain line extension spaced generally horizontally from the drain line and including means for trapping air within the drain line and for directing the trapped air into said expandable fluid chamber.

18. A method of blocking the back flow of sewage water in a gravity flow sewage drain line normally containing air, comprising the steps of forming a valve body defining a water passage, connecting the passage within the drain line, supporting a valve member within the valve body for movement between a retracted open position permitting water to flow through the passage and a closed position blocking the flow of water through the passage, forming an expandable fluid chamber including an actuator moveable between a first position and a second position, connecting the actuator to the valve member for moving the valve member from the open position to the closed position in response to movement of the actuator from the first position to the second position, trapping air displaced in the drain line by the backup of water, and using trapped air to increase the pressure in the expandable fluid chamber for moving the actuator to the second position and the valve member to the closed position.

19. A method as defined in claim 18 and including the step of arranging the valve member to move upwardly to the closed position and downwardly to the open position.

20. A method as defined in claim 18 and including the step of biasing the actuator in a direction for urging the actuator to the first position and the valve member to the open position when the pressure in the fluid chamber decreases for automatically opening the passage after backed-up water flows from the drain line.

21. A back water valve system adapted for use with a gravity flow sewage drain line containing air, said valve system comprising a valve body defining a water passage having an inlet and an outlet, a valve member disposed between said inlet and said outlet and moveable between a retracted open position permitting water to flow through said passage and a closed position blocking the flow of water through said passage, an expandable fluid chamber member including an actuator moveable between a first position and a second position, said actuator connected to said valve member for moving said valve member from said open position to said closed position in response to movement of said actuator from said first position to said second position, a trap member for trapping air displaced by water backing up in the drain line, and said trap member connected to said expandable fluid chamber member for increasing the fluid pressure within said expandable fluid chamber member and moving said actuator to said second position and said valve member to said closed position in response to an increase in pressure of trapped air.

* * * * *